(12) United States Patent
Miller et al.

(10) Patent No.: US 12,219,028 B2
(45) Date of Patent: Feb. 4, 2025

(54) LOCATION-BASED ASSIGNMENT OF CLIENT DEVICE DATA

(71) Applicant: DK Crown Holdings Inc., Boston, MA (US)

(72) Inventors: Joel Miller, Cambridge, MA (US); Vidyasagar Bhakthavatsalam, Malden, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 18/519,756

(22) Filed: Nov. 27, 2023

(65) Prior Publication Data

US 2024/0214461 A1   Jun. 27, 2024

Related U.S. Application Data

(60) Provisional application No. 63/477,079, filed on Dec. 23, 2022.

(51) Int. Cl.
| | | |
|---|---|---|
| *G06F 15/16* | (2006.01) | |
| *G06F 16/9537* | (2019.01) | |
| *H04L 67/306* | (2022.01) | |
| *H04L 67/52* | (2022.01) | |

(52) U.S. Cl.
CPC .......... *H04L 67/52* (2022.05); *G06F 16/9537* (2019.01); *H04L 67/306* (2013.01)

(58) Field of Classification Search
CPC .... H04L 67/52; H04L 67/306; G06F 16/9537
USPC ........................................................ 709/217
See application file for complete search history.

(56) References Cited

U.S. PATENT DOCUMENTS

| | | | |
|---|---|---|---|
| 9,363,221 B1* | 6/2016 | Ozog | H04L 67/306 |
| 2011/0202269 A1* | 8/2011 | Reventlow | H04L 63/10 |
| | | | 709/227 |
| 2012/0079019 A1* | 3/2012 | Miettinen | G06Q 50/00 |
| | | | 709/204 |
| 2016/0057238 A1* | 2/2016 | Oldacre | G06Q 50/01 |
| | | | 709/204 |
| 2022/0116404 A1* | 4/2022 | Manasse | H04L 63/1433 |
| 2024/0012888 A1* | 1/2024 | Varma | G06T 11/00 |

* cited by examiner

*Primary Examiner* — Alan S Chou
(74) *Attorney, Agent, or Firm* — Foley & Lardner LLP

(57) ABSTRACT

Systems and methods for location-based assignment of client device data are disclosed. A system can maintain data records associated with a player profile. The system can receive a request to access the player profile from a client device and determine location data of the client device. If the location data satisfies a first category, the system can filter the data records based on a data record type to generate a subset of data records and generate a first aggregate data record value based on a data record value of the subset of data records. If the location data satisfies a second location category, the system can generate a second aggregate data record value based on the data record value of each the data records. The system can provide, for display at the client device, an interface indicating the first aggregate data record value or the second aggregate data record value.

18 Claims, 6 Drawing Sheets

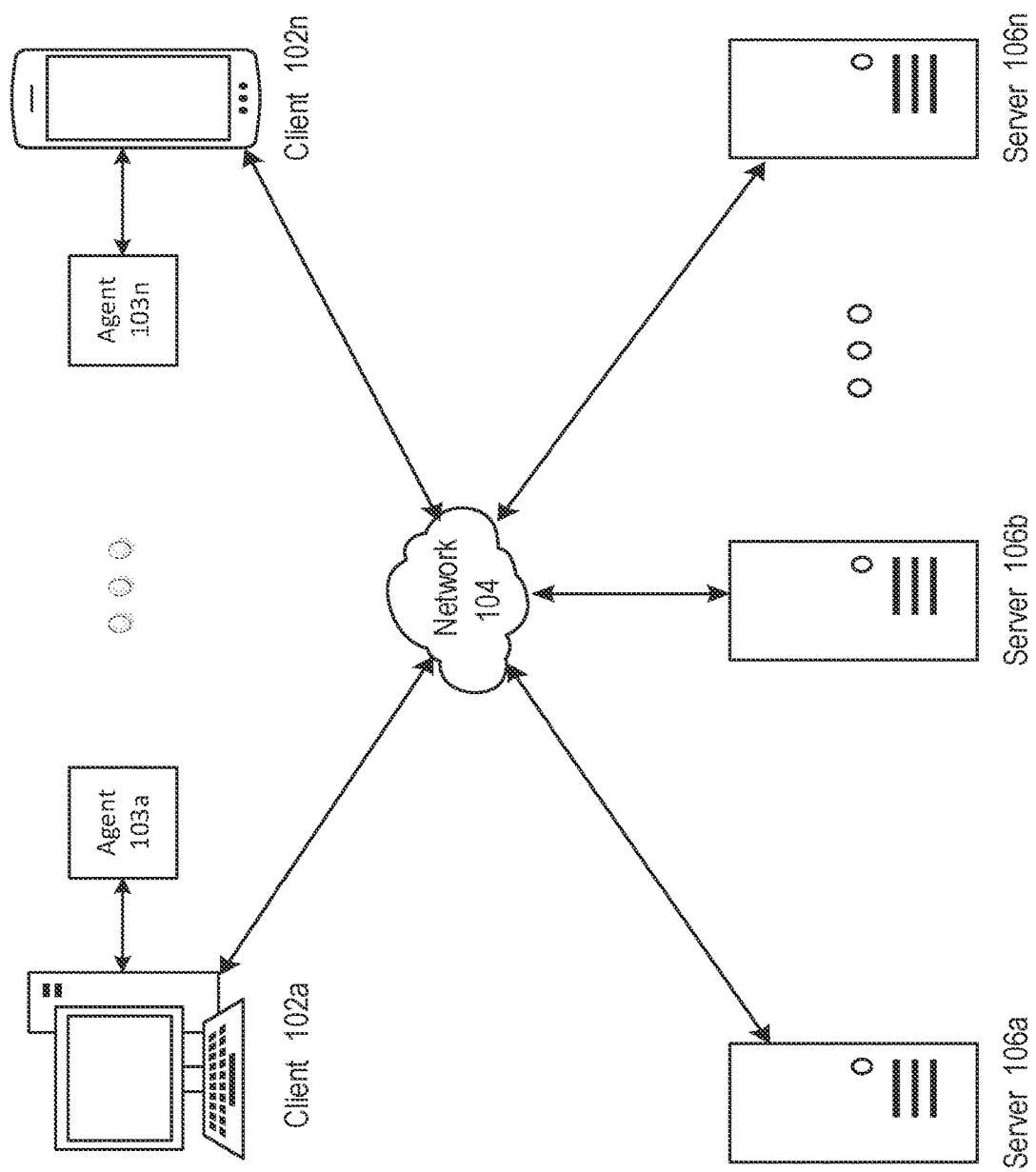

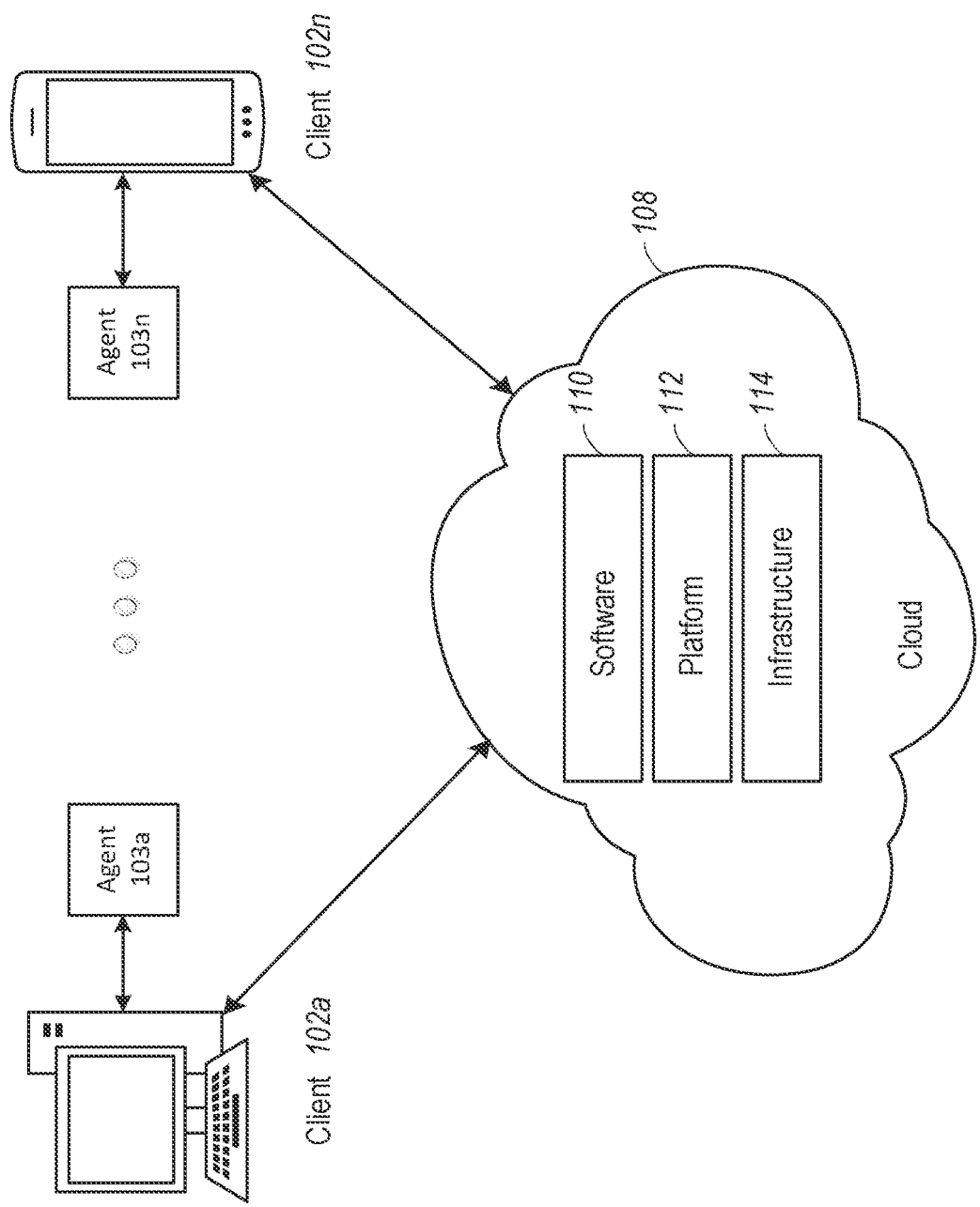

LOCATION-BASED ASSIGNMENT OF CLIENT DEVICE DATA

CROSS-REFERENCE TO RELATED APPLICATIONS

This application claims the benefit of and priority to U.S. Provisional Patent Application No. 63/477,079, filed on Dec. 23, 2022, the contents of which is incorporated herein by reference in its entirety for all purposes.

BACKGROUND

Content management systems allocate and utilize large amounts of computing resources to communicate and process data from a large number of remote computing devices. When serving a large number of mobile devices, memory and processing power are finite resources. Therefore, it is challenging to appropriately distribute and process information from a large number of devices while enforcing the security of said data.

SUMMARY

The systems and methods of this technical solution provide techniques for location-based assignment of client device data. Certain client data may be restricted based on various characteristics of the client device, including location data of the client device. To improve the security of information-sharing systems, the systems and methods described herein can automatically filter data records corresponding to the client device, such that only authorized data records can be utilized or displayed when the client device is located within a restricted region or area. These restricted data records can be accessed, for example, via an application executing on the client device. Depending on the data records that are filtered, the systems and methods described herein can automatically restrict certain functionality from being performed via the application. The techniques described herein therefore provide various technical improvements over conventional information systems.

At least one aspect of the present disclosure relates to a method for location-based assignment of client device data. The method can be performed, for example, by one or more processors coupled to a non-transitory memory. The method can include maintaining, in a database, a plurality of data records associated with a player profile. Each data record of the plurality of data records can identify a respective data record type and a respective data record value. The method can include receiving, from a first client device associated with the player profile, a first request to access the player profile. The method can include determining, based on the first request, first location data of the client device. The method can include, responsive to the first location data satisfying a first location category, filtering the plurality of data records based on the respective data record type of each data record of the plurality of data records to generate a subset of data records. The method can include generating a first aggregate data record value based on the respective data record value of each data record of the subset of data records. The method can include providing, for display at the client device, a user interface indicating the first aggregate data record value. The method can include receiving, from the first client device associated with the player profile, a second request to access the player profile. The method can include determining, based on the second request, second location data of the client device, where the second location data is different from the first location data. The method can include, responsive to the second location data satisfying a second location category, generating a second aggregate data record value based on the respective data record value of each data record of the plurality of data records, the second aggregate data record value being greater than the first aggregate data record value. The method can include providing, for display at the client device, a user interface indicating the second aggregate data record value.

In some implementations, the method can include providing, to the client device, instructions to display an alert indicating the first aggregate data record value has been generated based on the subset of data records. In some implementations, the method can include providing instructions to the client device to restrict at least one functionality of an application executing on the client device based on the first aggregate data record value. In some implementations, the method can include determining that the first location data satisfies the first location category based on the first location data indicating the client device is within a predetermined region. In some implementations, the method can include determining that the second location data satisfies the second location category based on the second location data indicating the client device is outside of the predetermined region.

In some implementations, the method can include executing a contest based on a portion of the first aggregate data record value of the subset of data records specified in a corresponding request received from the client device. In some implementations, the method can include providing, to the client device, instructions to display a user interface indicating the subset of data records. In some implementations, the user interface further comprises an indication of at least one data record that was filtered from the plurality of data records to generate the subset of data records. In some implementations, generating the first aggregate data record value comprises summing the respective data record value of each data record of the subset of data records. In some implementations, the method can include receiving, via an interaction with the user interface displayed at the client device, a request to perform an action based on the first aggregate data record value.

At least one other aspect of the present disclosure is directed to a system. The system can include one or more processors coupled to a non-transitory memory. The system can maintain, in a database, a plurality of data records associated with a player profile, each data record of the plurality of data records identifying a respective data record type and a respective data record value. The system can receive, from a first client device associated with the player profile, a first request to access the player profile. The system can determine, based on the first request, first location data of the client device. The system can, responsive to the first location data satisfying a first location category, filter the plurality of data records based on the respective data record type of each data record of the plurality of data records to generate a subset of data records. The system can generate a first aggregate data record value based on the respective data record value of each data record of the subset of data records. The system can provide, for display at the client device, a user interface indicating the first aggregate data record value. The system can receive, from the first client device associated with the player profile, a second request to access the player profile. The system can determine, based on the second request, second location data of the client device, where the second location data is different from the first location data. The system can, responsive to the second location data satisfying a second location category, generate a second aggregate data record value based on the respective data record value of each data record of the plurality of data records, the second aggregate data record value being greater than the first aggregate data record value. The system can provide, for display at the client device, a user interface indicating the second aggregate data record value.

In some implementations, the system can provide, to the client device, instructions to display an alert indicating the first aggregate data record value has been generated based on the subset of data records. In some implementations, the system can provide instructions to the client device to restrict at least one functionality of an application executing on the client device based on the first aggregate data record value. In some implementations, the system can determine that the first location data satisfies the first location category based on the first location data indicating the client device is within a predetermined region. In some implementations, the system can determine that the second location data satisfies the second location category based on the second location data indicating the client device is outside of the predetermined region.

In some implementations, the system can execute a contest based on a portion of the first aggregate data record value of the subset of data records specified in a corresponding request received from the client device. In some implementations, the system can provide, to the client device, instructions to display a user interface indicating the subset of data records. In some implementations, the user interface further comprises an indication of at least one data record that was filtered from the plurality of data records to generate the subset of data records. In some implementations, the system can generate the first aggregate data record value by performing operations comprising summing the respective data record value of each data record of the subset of data records. In some implementations, the system can receive, via an interaction with the user interface displayed at the client device, a request to perform an action based on the first aggregate data record value.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular forms of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an embodiment of a network environment comprising a client device in communication with a server device;

FIG. 1B is a block diagram depicting a cloud computing environment comprising a client device in communication with cloud service providers;

DETAILED DESCRIPTION

Figure 1C:
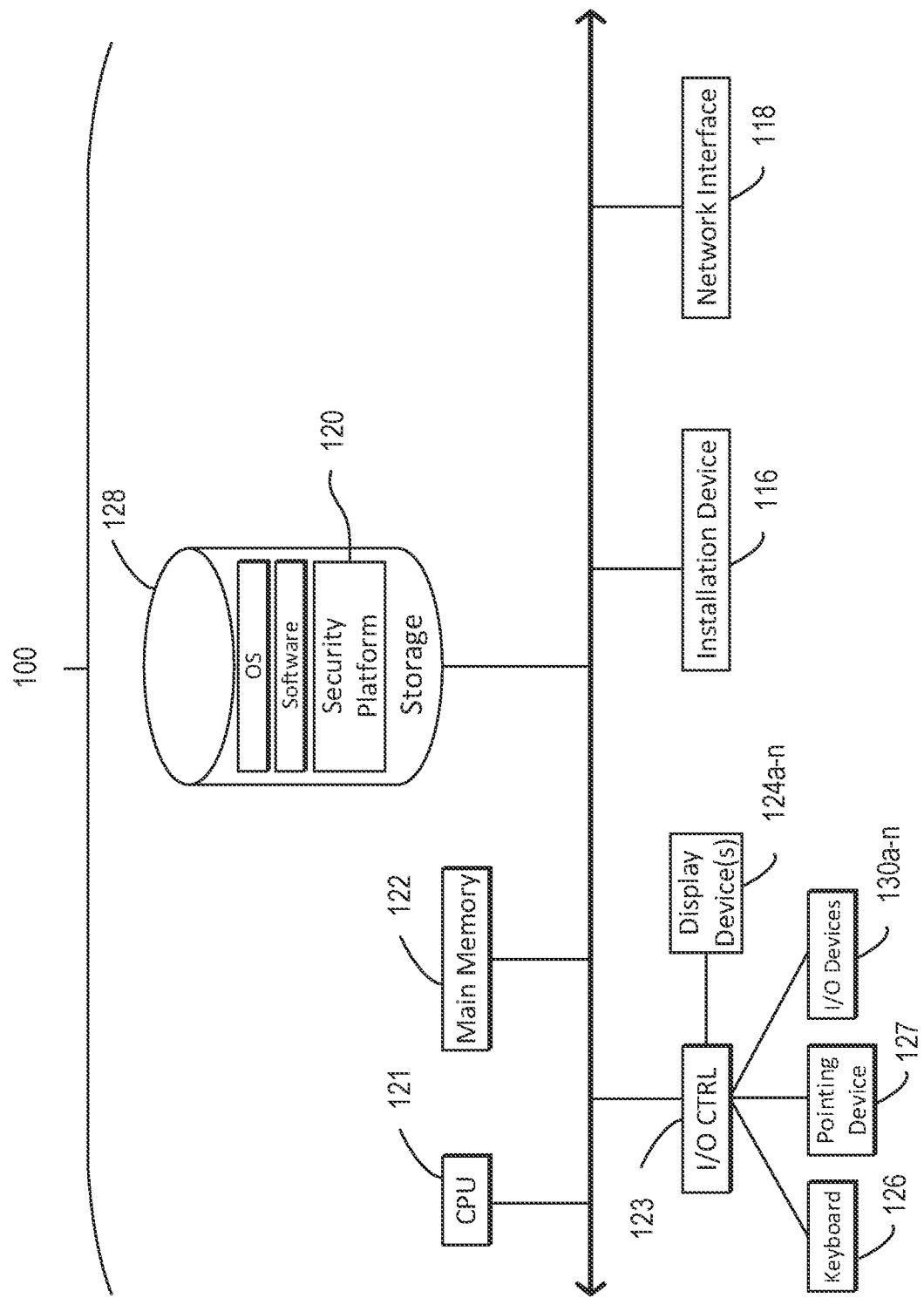
FIGS. 1C and 1D are block diagrams depicting embodiments of computing devices useful in connection with the methods and systems described herein.

Below are detailed descriptions of various concepts related to, and implementations of, techniques, approaches, methods, apparatuses, and systems for location-based assignment of client device data. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for location-based assignment of client device data.

A. Computing and Network Environment

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include an application layer, transport layer, internet layer (including, e.g., IPv6), or link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm (not shown) or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide area network (WAN) connection or a metropolitan area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local area network (LAN) connection or some form of direct connection. Additionally, a heterogeneous machine farm may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm may be decentralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1D:
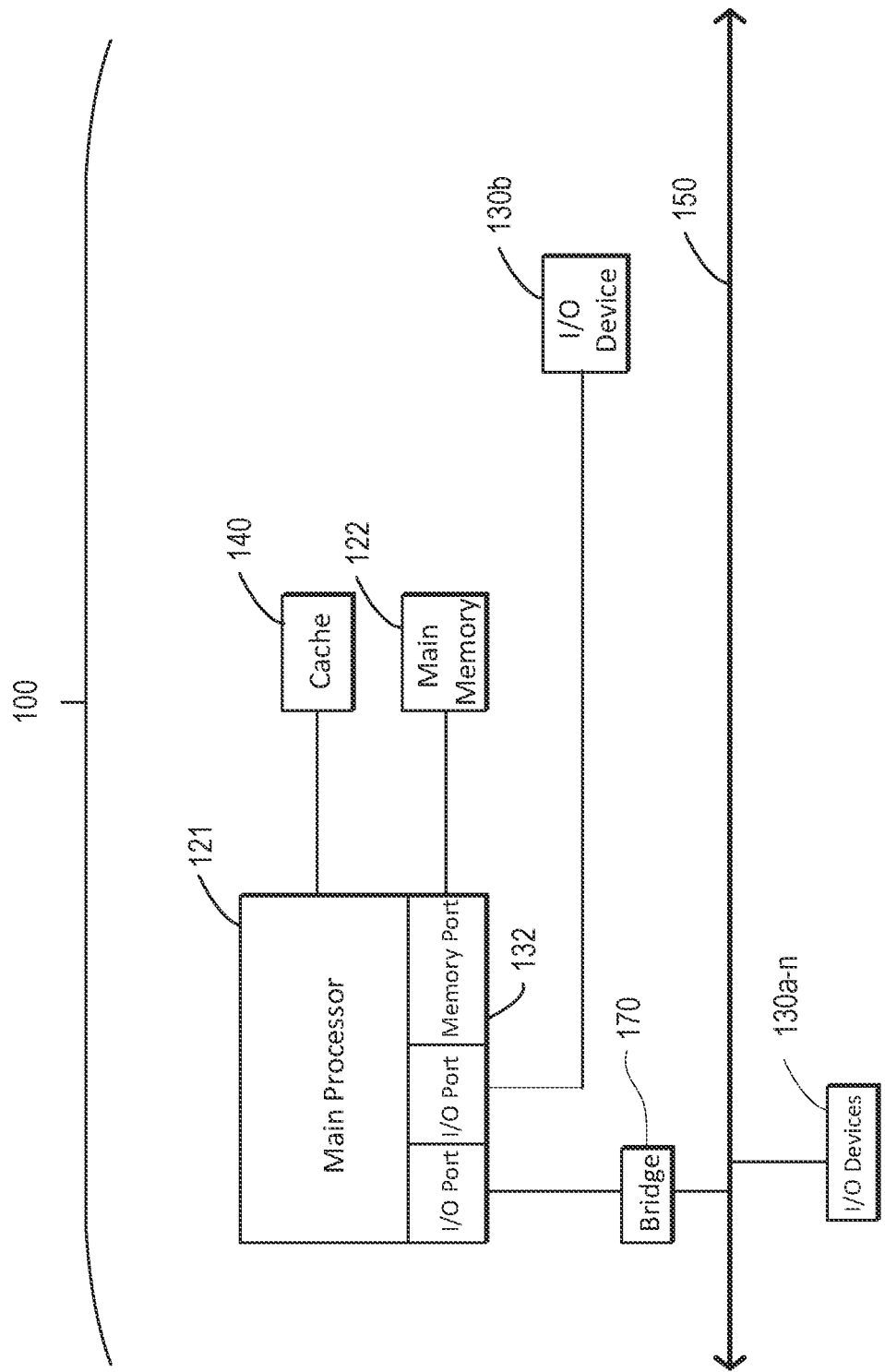

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g., a mouse. The storage device 128 may include, without limitation, an operating system, software, and security platform 120, which can implement any of the features of the data processing system 205 described herein below in connection with FIG. 2. As shown in FIG. 1D, each computing device 100 may also include additional optional elements, e.g., a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by NVIDIA of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus 150 but communicates with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes, including authentication and other commands. Some devices 130a-130n provide for voice recognition and inputs, including, e.g., Microsoft KINECT, SIRI for IPHONE by Apple, Google Now, or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or groups of devices may be augmented reality devices. The I/O devices 130a-130n may be controlled by an I/O controller 123 as shown in FIG. 1C. The I/O controller 123 may control one or more I/O devices 130a-130n, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may include, e.g., stereoscopy, polarization filters, active shutters, or autostereoscopic. Display devices 124a-124n may also be head-mounted displays (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable, or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100 via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the security platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage devices 128 may be internal and connect to the computing device 100 via a bus 150. Some storage devices 128 may be external and connect to the computing device 100 via an I/O device 130 that provides an external bus. Some storage devices 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage devices 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102a-102n may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/ AAC, WMA Protected AAC, AIFF, Audible audiobook, Apple Lossless audio file formats and .mov, .m4v, and .mp4 MPEG-4 (H.264/ MPEG-4 AVC) video file formats.

In some embodiments, the computing device 100 is a tablet, e.g., from the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the client device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the client device 102 is a laptop or desktop computer equipped with a web browser and a microphone and speaker system, e.g., a telephony headset. In these embodiments, the client devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Location-Based Assignment of Client Device Data

The systems and methods of this technical solution provide techniques for location-based assignment of client device data. Certain client data may be restricted based on various characteristics of the client device, including location data of the client device. To improve the security of information-sharing systems, the systems and methods described herein can automatically filter data records corresponding to the client device, such that only authorized data records can be utilized or displayed when the client device is located within a restricted region or area.

A request for data records can be transmitted by a client device. The request may include location data, or the location data may be accessed by the systems and methods described herein from an alternative source. The request for data records may specify an action to perform utilizing the data records. In response to the request, the systems and methods described herein can automatically filter the data records based on the location data of the client device (e.g., data records that comply with a security policy, for example). The filtered data records can then be provided or otherwise indicated at the client device, along with one or more permitted actions that may be performed via the application using the filtered data records. Depending on the data records that are filtered, the systems and methods described herein can automatically restrict certain functionality from being performed via the application. The techniques described herein therefore provide various technical improvements over conventional information systems.

Figure 2:
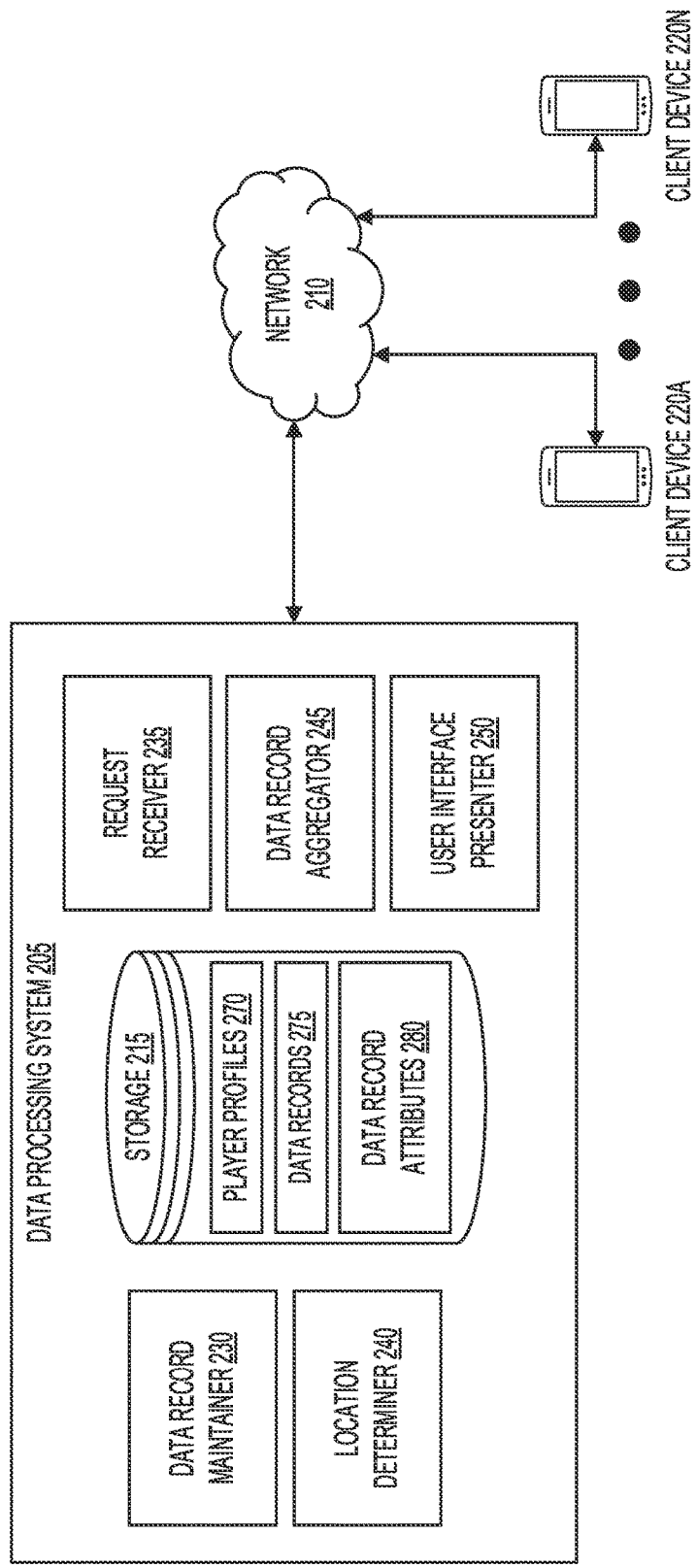
FIG. 2 is a block diagram of an example system for location-based assignment of client device data, in accordance with one or more implementations.

Referring now to FIG. 2, illustrated is a block diagram of an example system 200 for location-based assignment of client device data, in accordance with one or more implementations. The system 200 can include at least one data processing system 205, at least one network 210, and one or more client devices 220A-220N (sometimes generally referred to as client device(s) 220). The data processing system 205 can include a data record maintainer 230, a request receiver 235, a location determiner 240, a data record aggregator 245, a user interface presenter 250, and at least one storage 215. The storage 215 can include one or more player profiles 270, one or more data records 275 (individual data records of which are sometimes referred to as a "data record 275"), and one or more data record attributes 280 (individual attributes are sometimes referred as a "data record attribute 280"). Although shown here as internal to the data processing system 205, the storage 215 can be external to the data processing system 205, for example, as a part of a cloud computing system or an external computing device in communication with the devices (e.g., the data processing system 205, the client devices 220, etc.) of the system 200 via the network 210.

Each component (e.g., the data processing system 205, the network 210, the client devices 220, the data record maintainer 230, the request receiver 235, the location determiner 240, the data record aggregator 245, the user interface presenter 250, the storage 215, etc.) of the system 200 can be implemented using the hardware components or a combination of software with the hardware components of a computing system, such as the computing system 100 detailed herein in conjunction with FIGS. 1A-1D, or any other computing system described herein. Each component of the data processing system 205 can perform the functionalities detailed herein.

The data processing system 205 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), a tensor processing unit (TPU), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the computer system 100 described herein in conjunction with FIGS. 1A-1D.

In some implementations, the data processing system 205 may communicate with the client devices 220, for example, to provide user interfaces (e.g., the user interfaces described herein that can be utilized to request access to a player profile 270, any data records 275 associated therewith, or to perform one or more actions within an application executing on a client device 220, etc.) and to receive user input, via the network 210. In one example, the data processing system 205 can be or can include an application server or webserver, which may include software modules allowing various computing devices (e.g., the client devices 220, etc.) to access or manipulate data stored by the data processing system 205. For example, the data processing system 205 may include a webserver allowing the client devices 220 to access data (e.g., via one or more web-based user interfaces, one or more application interfaces, etc.) that is collected and manipulated by the data processing system 205. For example, a player accessing the functionality of the data processing system 205 using a corresponding player profile 270 may execute a web browser application and access a website hosted on the webserver in order to access data (e.g., one or more interfaces to select combinations of conditional events 275 for one or more live events as described herein, etc.).

The network 210 can include computer networks such as the Internet, local, wide, metro or other area networks, intranets, satellite networks, other computer networks such as voice or data mobile phone communication networks, or combinations thereof. The data processing system 205 of the system 200 can communicate via the network 210 with one or more computing devices, such as the one or more client devices 220. The network 210 may be any form of computer network that can relay information between the data processing system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive or transmit data within the network 210.

The network 210 may further include any number of hardwired or wireless connections. Any or all of the computing devices described herein (e.g., the data processing system 205, the one or more client devices 220, the computer system 100, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory (e.g., a processing circuit). The memory can store processor-executable instructions that, when executed by the processor, cause the processor to perform one or more of the operations described herein. The processor can include a microprocessor, an ASIC, an FPGA, a GPU, a TPU, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various operations as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in connection with FIGS. 1A-1D.

Each client device 220 can be a personal computer, a laptop computer, a television device, a smart phone device, a mobile device, or another type of computing device. Each client device 220 can be implemented using hardware or a combination of software and hardware. Each client device 220 can include a display or display portion. The display can include a display portion of a television, a display portion of a computing device, a GUI, or another type of interactive display (e.g., a touchscreen, a display, etc.) and one or more I/O devices (e.g., a mouse, a keyboard, digital key pad). The display can present one or more user interfaces, including user interfaces that enable generation of one or more data records 275, that enable utilizing one or more data records 275 for one or more permitted actions (as described herein), or that otherwise provide access to data associated with a corresponding player profile 270. The display of a client device 220 can include a touch screen, which can display an application, such as a web browser application or a native application, which may be used to access the functionality of the data processing system 205, as described herein.

The display may include a border region (e.g., side border, top border, bottom border). The display can include a touch screen display, which can receive interactions from a player. The client device 220 may also receive interactions via any other type of I/O device. The interactions can result in interaction data, which can be stored and transmitted by the processing circuitry of the client device 220. The interaction data can include, for example, interaction coordinates, an interaction type (e.g., drag, click, swipe, scroll, tap, etc.), and an indication of an actionable object (e.g., an interactive user interface element, such as a button, hyperlink, etc.) with which the interaction occurred. The interaction data can identify a user interface element with which the interaction occurred, and may indicate or otherwise trigger execution of processor-executable instructions (e.g., which may be provided by the data processing system 205, as described herein).

Each client device 220 can include an input device that couples or communicates with the display of each client device 220 to enable a player to interact with or select one or more interactive user interface elements (sometimes referred to herein as "actionable objects"), as described herein. The display can enable interaction with one or more visual indications provided through the display of each client device 220, and responsive to an interaction (e.g., select, click-on, touch, hover), the client device 220 can generate an indication identifying a user input or selection of an action (e.g., a request to access a player profile 270, a request to display data records 275 associated with the player profile 270, a deposit, a wager, a selection of a contest, a live event, etc.) or other functionality described herein.

Each client device 220 can include or be identified by a device identifier, which can be specific to each respective client device 220. The device identifier can include a script, code, label, or marker that identifies a particular client device 220. In some implementations, the device identifier can include a string or plurality of numbers, letters, characters, or any combination numbers, letters, and characters. In some embodiments, each client device 220 can have a unique device identifier. Each client device 220 can include a client application, which can be a web browser or a native application that communicates with the data processing system 205 to present user interfaces, generate or request generation of one or more data records 275, access a player profile 270, access data records 275 corresponding to a player profile 270, or other functionality described herein. The client application can be executing on each client device 220, and may be provided to the client device 220 by the data processing system 205. The application can include a web application, a server application, a resource, a desktop, or a file.

The application can include a local application (e.g., local to a client device 220), hosted application, a SaaS application, a virtual application, a mobile application, or other forms of content. In some implementations, the application can include or correspond to applications provided by remote servers or third-party servers. In some implementations, the application can access the player profiles 270 or the data records 275 (or a filtered subset of the data records 275) stored and maintained in the storage 215, and generate one or more interactive user interface elements for display on the client device 220. Some example interactive user interface elements include user-selectable hyperlinks, buttons, graphics, videos, images, or other application features. Interactions with such interactive user interface elements can cause the application executing on the respective client device 220 to generate a signal, which can cause the application to perform further operations corresponding to the actionable object.

In some implementations, one or more client devices 220 can establish one or more communication sessions with the data processing system 205. A communication session can include a channel or connection between the data processing system 205 and a respective client device 220. The one or more communication sessions can each include an application session (e.g., virtual application), an execution session, a desktop session, a hosted desktop session, a terminal services session, a browser session, a remote desktop session, a URL session or a remote application session. Each communication session can include encrypted or secure sessions, which can include an encrypted file, encrypted data, or encrypted traffic.

In some implementations, in response to interactions with corresponding user interface elements, the application executing on a client device 220 can transmit information, such as player profile 270 information (e.g., changing player profile 270 parameters, changing login information, etc.), requests to generate one or more data records 275, request to list one or more data records 275, request to perform actions utilizing one or more data records 275, interaction information, selections of wager amounts, selections of wagers, selections of contests, selections to request players, plays, or other attributes or potential actions that may occur during an identified live event, among other selections described herein. For example, the client device 220 can transmit a request for one or more participants of a live event (e.g., athletes playing for a particular team during a live event, etc.). Additional requests may also be transmitted, including requests to generate one or more data records 275, requests to display permitted actions based on location data, requests to place one or more wagers, or requests for information (e.g., the data record attributes 280, information showing which data records 275 are filtered based on location data, available wagers, odds information, etc.) related to one or more live events, among others. The requests can be hypertext transfer protocol (HTTP or HTTPS) request messages, file transfer protocol messages, email messages, text messages, or any other type of message that can be transmitted via the network 210.

As described herein, a client device 220 can receive one or more interactions with actionable objects presented on the display of the client device. Interactions can be tap interactions, click interactions, or other types of indications that a user is engaged with a particular user interface element. Upon detecting an interaction with a particular user interface element, the client device 220 can execute instructions (e.g., processor-readable code, a script, etc.) that cause the client device 220 to transmit an appropriate signal to the data processing system 205. Additionally, the client devices 220 may receive and display one or more content items or interactive user interface elements that may correspond to one or more data records 275, one or more actions that can be performed using the one or more data records 275, one or more contests, one or more live events, one or more odds values, or one or more live event participants, as described herein.

In some implementations, the application interfaces can display (e.g., in response to a corresponding request transmitted to the data processing system 205) one or more data records 275. The data records 275 (or content items corresponding thereto) may be displayed with one or more corresponding data record attributes 280. The data records 275 (or content corresponding thereto) may be displayed or arranged according to one or more of the data record attributes 280 (e.g., ranked according to respective data record values, ranked according to a location of a client device at which the data record was generated, information utilized to generate a particular data record, etc.). The application interfaces can display one or more permitted (or restricted) actions specified by the data processing system 205 based on location data of the client device.

The storage 215 can be a computer-readable memory that can store or maintain any of the information described herein. The storage 215 can store or maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, or any other computing device described herein, via the network 210. In some implementations, the storage 215 can be internal to the data processing system 205. In some implementations, the storage 215 can exist external to the data processing system 205, and may be accessed via the network 210. The storage 215 can be distributed across many different computer systems or storage elements, and may be accessed via the network 210 or a suitable computer bus interface. The data processing system 205 can store, in one or more regions of the memory of the data processing system 205, or in the storage 215, the results of any or all computations, determinations, selections, identifications, generations, constructions, or calculations in one or more data structures indexed or identified with appropriate values.

Any or all values stored in the storage 215 may be accessed by any computing device described herein, such as the data processing system 205, to perform any of the functionalities or functions described herein. In some implementations, a computing device, such as a client device 220, may utilize authentication information (e.g., username, password, email, etc.) to show that the client device 220 is authorized to access requested information in the storage 215. The storage 215 may include permission settings that indicate which users, devices, or profiles are authorized to access certain information stored in the storage 215. The storage 215 may be similar to or include the storage 128 described herein above in conjunction with FIG. 1C. In some implementations, instead of being internal to the data processing system 205, the storage 215 can form a part of a cloud computing system. In such implementations, the storage 215 can be a distributed storage medium in a cloud computing system and can be accessed by any of the components of the data processing system 205, by the one or more client devices 220 (e.g., via one or more user interfaces, etc.), or any other computing devices described herein.

The storage 215 can store one or more player profiles 270 in one or more data structures. Each player profile 270 can be associated with a corresponding player (e.g., a user) of a client device 220 that accesses the functionality of the data processing system 205. In implementations where the data processing system 205 can operate without using a client device 220 (e.g., a slot machine, a video game machine, a standalone wagering kiosk, etc.), a player profile 270 may correspond to a player that accesses the data processing system 205 to generate data records 275, access data record attributes 280, or perform one or more actions utilizing the data records 275 (e.g., enter contests, access games, place wagers, etc.). Each player profile 270 can be a user profile that includes information about a user. Each player profile 270 may include information about one or more of the client devices 220 used to access the data processing system 205 using the player profile 270. For example, identifiers of a player profile 270 can be used to access the functionality of the data processing system 205 via the network 210. The player profiles 270 may store records of client device location data (e.g., stored in association with corresponding timestamps, etc.), which may be utilized to perform one or more of the functionalities described herein. The location data can include any type of location-identifying information, such as global-positioning system (GPS) coordinates, wireless access point information, or cellular information (e.g., information relating to nearby cell towers, etc.), among others.

The identifiers of player profiles 270 can include a username, a password, an e-mail address, a phone number, a personal identification number (PIN), a secret code-word, or device identifiers for use in a two-factor authentication technique, among others. The player profile 270 can store information about location data of corresponding client devices 220, requests to generate data records 275, historic wagers, games accessed using the player profile, historic games viewed or wagered upon using the player profile 270, and historic wager or live event outcomes, among other information. The player profile 270 can store a credit balance or wager information (e.g., as part of or derived from the one or more data records 275 or a filtered subset of the one or more data records 275, an amount of a wager, a timestamp associated with a wager, information about the presence of an indication to participate in a bonus opportunity using the wager, a client device identifier of a client device that was used to place the wager, wager types, etc.).

The player profile 270 can store information about a client device 220 used to access the data processing system 205 such as an internet protocol (IP) address, a media access control (MAC) address, location data of a corresponding client device 220, a global unique identification (GUID), a player profile 270 name (e.g., the name of a user of the client device 220, a player-chosen username, etc.), device name, among others. In some implementations, a player profile 270 can be created by the data processing system 205 in response to a player profile 270 creation request transmitted by a client device 220. The player profile 270 creation request can include any of the player profile 270 information described herein. In some implementations, a client device 220 accessing the data processing system 205 may not be associated with a player profile 270. In such implementations, the data processing system 205 can automatically create a player profile 270 using an identifier of the client device 220 provided by the client device 220.

The data processing system 205 can store one or more data records 275 in the storage 215, for example, in one or more data structures. As described herein, the client device 220 can transmit interaction data to the data processing system 205 that includes a request to generate one or more data records 275. A data record 275 can be or include information relating to a credit balance increase of a player profile 270. For example, a client device 220 can transmit a request to increase the credit balance of the player profile 270, and may include a source of funds. The source of funds can be a bank transfer (e.g., a debit card transfer, a credit card transfer, a wire transfer, an automatic clearing house (ACH) transfer, etc.) or a credit transfer from another player profile 270, among other sources. Upon approval of the transfer (e.g., which may be verified by the data processing system 205), the data processing system 205 can generate a data record that stores an association between the credit balance increase and the source of the funds used to carry out the increase. The source of funds may be stored, for example, as an additional column or row in a database entry corresponding to the funds increase. The data record 275 may include or may be stored in association with one or more corresponding data record attributes 280. The data record 275 may be stored in association with a location of the client device 220 that transmitted the request to generate the data record 275 (e.g., the request to increase the credit balance of the player profile 270). The location data may be included in the request, retrieved from a sensor of the client device 220, or determined via a third-party computing system (not shown).

The storage 215 can store or maintain one or more data record attributes 280 associated with one or more corresponding data records 275, for example, in one or more data structures. As described herein, a data record 275 can include an indication of an increase to a credit balance of a player profile 270. The attributes of the increase can be stored as the data record attributes 280, and can be generated by the data processing system 205 upon generation of a corresponding data record. The data record attributes 280 can include a data record value (e.g., an amount by which the credit balance was increased), a data record type, and in some implementations, location data of the client device 220 that indicates a location of the client device 220 when generation of the corresponding data record 275 is requested. The data record type may include an indication of a source from which the credit transfer takes place (e.g., a bank transfer, a credit card purchase, a transfer from a second player profile 270, etc.). The data record attributes 280 may be stored in association with a corresponding data record 275, and may be accessed to determine which data records 275 can be utilized to perform various functions based on a location of the client device 220. The data record attributes 280 may be generated, for example, upon approval of a transfer of credits to a credit balance of the player profile 270. The data record attributes 280 may include an identifier of the player profile 270 to which the corresponding data record 275 corresponds.

Referring now to the operations of the data processing system 205, the data record maintainer 230 can maintain, in the storage 215 (e.g., as part of a database, in one or more data structures, etc.), one or more data records 275 that are associated with one or more player profiles 270. Each data record 275 can include or be associated with one or more data record attributes 280, which can indicate a respective data record type and a respective data record value. As described herein, the data records 275 can be or include information relating to a credit balance increase of a player profile 270. To generate a data record 275, a client device 220 can transmit a request to increase the credit balance of the player profile 270. The request may include location data of the client device 220 at the time the request was transmitted. In some implementations, the request can identify an amount by which to increase the credit balance, and may include location information (e.g., GPS coordinates, wireless access point location data, cellular location data, satellite location information, etc.) of the client device 220 that transmitted the request.

The request can include a source of funds for the credit balance increase. The source of funds can be a bank transfer (e.g., a debit card transfer, a credit card transfer, a wire transfer, an ACH transfer, etc.) or a credit transfer from another player profile 270, among other sources. Upon approval of the transfer (e.g., which may be verified by the data processing system 205), the data processing system 205 can generate a data record 275 that stores an association between the credit balance increase and the source of the funds used to carry out the increase. The source of funds may be stored, for example, as an additional column or row in a database entry corresponding to the funds increase. The data record maintainer 230 can verify that the transfer of funds has been approved (e.g., in response to detecting an approval of a transfer of money, upon receiving a confirmation message from a third-party verification computing system, etc.). In implementations where the request to generate the data record 275 includes payment information, the data record maintainer 230 can execute a transaction (e.g., by communicating with an external payment system via the network 210), which can be verified by receiving an approval message from the external payment system.

Upon verification, the data record maintainer 230 can generate the data record 275 in association with the player profile that stores a record of the increase in the credit balance. The data record maintainer 230 can generate corresponding data record attributes 280 for the data record. As described herein, the data record attributes 280 can include a data record value (e.g., an amount by which the credit balance was increased), a data record type, and in some implementations, location data of the client device 220 that indicates a location of the client device 220 when generation of the corresponding data record 275 is requested. The data record type may include an indication of a source from which the credit transfer takes place (e.g., a bank transfer, a credit card purchase, a transfer from a second player profile 270, etc.). The data record attributes 280 may be stored in association with a corresponding data record 275, and may be accessed to determine which data records 275 can be utilized to perform various functions based on a location of the client device 220. The data record attributes 280 may be generated, for example, upon approval of a transfer of credits to a credit balance of the player profile 270. The data record attributes 280 may include an identifier of the player profile 270 to which the corresponding data record 275 corresponds.

The request receiver 235 can receive, from a client device 220 associated with a player profile 270, a request to access the player profile 270. The request to access the player profile 270 can include any type of request relating to the data records. For example, the request can be a request to view an available credit balance of the player profile 270. The request may include login information, which can be verified by the data processing system 205 prior to generating a response to the request, as described herein. The request to access the player profile 270 can be transmitted by an application executing on the client device 220 that communicates with the data processing system 205. The application may be a native or web-based application, and may include various functionalities that can be controlled (e.g., enabled, restricted, etc.) by the data processing system 205, using the techniques described herein. The request may be transmitted by the application in response to an interaction with one or more user interface elements in the application.

In some implementations, the application can be utilized to transmit a request to generate one or more data records 275 for the player profile 270, as described herein. The request to access the player profile 270 can be, for example, a request to view an available credit balance, a request to provide funds for a game, contest, or wager, or a request view funds available based on a location of the client device, among any other request described herein. The request to access the player profile may be a request to view data associated with the player profile, such as the data records 275, the data record attributes 280, or other attributes of the player profile 270. In some implementations, the request to access the player profile 270 can include location information of the client device 220. The location data can include any type of location-identifying information, such as global-positioning system (GPS) coordinates, wireless access point information, or cellular information (e.g., information relating to nearby cell towers, etc.), among others.

The location determiner 240 can determine location data of the client device 220 based on the request. As described herein, the location data can include can include any type of location-identifying information, such as global-positioning system (GPS) coordinates, wireless access point information, or cellular information (e.g., information relating to nearby cell towers, etc.), among others. The location data may be determined, for example, from the client device 220 as part of the request to access the player profile 270, from the client device 220 in response to a request from the location determiner 240, or from an external computing system. For example, the location determiner 240 may communicate with one or more computing systems that maintain location information of client devices 220 to retrieve location data (e.g., based on an identifier of the client device 220 included in the request to access the player profile 270) for the requesting client device 220. The external computing system may be, for example, a computing system of a cellular provider or a location services provider.

The location determiner 240 can determine whether the client device 220 is located in one or more predetermined regions based on the location data when the client device 220 transmitted the request to access the player profile 270. The location determiner 240 can maintain a set of regions that are each associated with a respective category. The set of regions may be configured by an administrator of the data processing system 205 (e.g., transmitted to the data processing system 205 via the network 210). The location determiner 240 can utilize the location information of the client device 220 to determine whether the client device 220 is within any predetermined region (e.g., within a predetermined city, state, country, or predetermined boundary, etc.). If the location determiner 240 determines that the client device 220 is within a region corresponding to a restricted location category, the location determiner 240 can determine that the client device 220 is within a restricted location. If the location determiner 240 determines that the client device 220 is within a region corresponding to an unrestricted location category, the location determiner 240 can determine that the client device 220 is within an unrestricted location. The location determiner 240 can store the location category of the client device 220 in association with the corresponding request to access the player profile 270.

If the location determiner 240 determines that the client device 220 is located within a restricted region, the data record aggregator 245 can filter the data records 275 based on the respective data record type of each data record of the data records 275 to generate a subset of data records 275. Certain locations may restrict functionality of the application executing on the client device 220, or may pose security risks with respect to the data records 275 stored in association with the player profile 270. To address these issues, the data record aggregator 245 can filter the data records by filtering the types of data records 275 that are restricted from a particular location. For example, certain purchases (e.g., credit card purchases) may be not usable for certain actions (e.g., wagers) within certain regions. In some implementations, the data record aggregator 245 can filter out all data records 275 (e.g., corresponding to credits to a balance of the player profile 270) that have a type that identifies a credit card. Other types of filtering are also possible. For example, each region may be associated with a list of restricted data record types.

The data record aggregator 245 can identify each data record 275 associated with the player profile 270 that does not have a type that is restricted for the particular region in which the client device 220 was located upon transmitting the request to access the player profile 270. The subset of data records 275 can be identified, for example, by scanning through each data record and comparing the type to one or more restricted types of the region, or performing a database query to lookup each of the data records 275 having types that are not restricted by the respective region. If the region is an unrestricted region (e.g., all types of data records 275 can be provided to the client device 220 while the client device is within the region), the data record aggregator 245 can identify all of the data records associated with the player profile 270 of the client device 220.

Once the data records 275 (e.g., the subset if the client device 220 is within a restricted location, or all the data records if the client device is within an unrestricted location) have been identified, the data record aggregator 245 can generate an aggregate data record value based on the respective data record value of each identified data record 275. To do so, the data record aggregator 245 can iterate through the data record attributes 280 of each identified data record 275, and sum the respective data record value (e.g., an amount by which the credit balance of the player profile 270 was incremented). The aggregate value can be equal to the credit balance of the player profile less any contributions from restricted sources (e.g., credit card balances). Summing the data record values can include incrementing a counter by an amount equal to the respective data record value indicated in the data record attributes 280 of each data record 275. The aggregate data record value can then be stored in association with the player profile 270, and in some implementations, in association with the one or more restrictions applied by the respective region in which the client device 220 was located. In some implementations, the data record aggregator 245 can store the aggregate data record value in association with a list or set of the data records 275 that were filtered according to the restriction(s) of the region. In some implementations, the data record aggregator 245 can store the aggregate data record value in association with a list or set of the data records 275 that were not filtered (e.g., part of the subset identified by the data record aggregator 245).

Once the aggregate data record value has been calculated, the user interface presenter 250 can provide, for display at the client device 220, instructions to display a user interface indicating the aggregate data record value. The instructions can be provided to the client device 220 in response to the request to access the player profile 270. For example, the user interface presenter 250 can generate display instructions (e.g., HTML, JavaScript, configuration data that populates or configures one or more application interfaces, etc.) that cause the client device 220 to display one or more user interfaces that indicate the aggregate data record value. In some implementations, the user interface presenter 250 may provide data that is used by the application executing on the client device to populate one or more user interfaces displayed on the client device 220.

In some implementations, the user interface presenter 250 can provide instructions to display an alert indicating that the aggregate data record value has been generated based on a subset of the data records 275. The alert may include one or more indications of the restriction(s) that were utilized to filter the data records 275, if any. The alert may include an indication of the detected location of the client device 220 (e.g., the location data, the region within which the client device 220 was determined to be present, etc.). In some implementations, the user interface presenter 250 can cause the client device (e.g., by providing display instructions or data) to display a user interface indicating the subset of data records 275 (e.g., those that were not filtered from the data records associated with the player profile 270). The user interface may be displayed, for example, in response to an interaction with an interactive user interface element at the user interface, or in response to the request to access the player profile 270, as described herein.

In some implementations, the user interface presenter 250 can cause the client device 220 to display (e.g., in one or more user interfaces) an indication of one or more data records 275 that were filtered from the data records 275 associated with the player profile 270. The filtered data records 275 can be indicated as greyed out or may be displayed with an indicator that the respective data record 275 (or the data record value associated therewith) was restricted. The various user interfaces described herein can be displayed in response to corresponding interactions, or in response to requests transmitted by the client device 220. The user interfaces described herein may include actionable objects that cause the client device 220 to perform one or more operations (e.g., transmit requests to place wagers, enter contests, or otherwise utilize the aggregate data record value displayed on the user interface).

In some implementations, the user interface presenter 250 can provide instructions to the client device to restrict at least one functionality of the application executing on the client device 220 based on the aggregate value. For example, the user interface presenter 250 can grey out, or otherwise make un-selectable, certain graphical user interface elements that correspond to actions that are restricted by the location in which the client device 220 is positioned. In some implementations, if the aggregate data record value (due to filtering) is less than a predetermined threshold for a particular action (e.g., a predetermined number of required credits for a game, wager, or contest), the user interface presenter 250 can provide instructions to restrict the application from performing said actions. The instructions can include instructions to remove, hide, or otherwise make unselectable user interface elements corresponding to the respective actions. In some implementations, the user interface presenter 250 can provide an alert indicating which actions within the application, if any, are restricted based on the aggregate data value. In some implementations, the user interface elements corresponding to the restricted actions can be displayed with a respective indicator that indicates the action corresponding to the user interface element has been restricted.

The user interface presenter 250 can receive, via an interaction with the user interface displayed at the client device 220, a request to perform an action based on the aggregate data record value. For example, the aggregate data record value can correspond to a number of credits or a value that can be utilized to perform one or more actions via the data processing system 205, such as enter a contest, place a wager, or play a game. If the aggregate data record value satisfies a threshold corresponding to a particular action indicated in the request, the data processing system 205 can reduce the aggregate data record value by an amount corresponding to the action (e.g., a specified wager amount, a contest entrance fee, a game fee or wager, etc.). Upon doing so, the data processing system 205 can execute the particular action. For example, the data processing system 205 can execute a contest based on the portion deducted from the aggregate data record value to enter the contest. Any particular action that may utilize credits or funds can be executed by the data processing system 205 using the aggregate data value calculated based on the location of the client device 220 and the data records 275.

Figure 3:
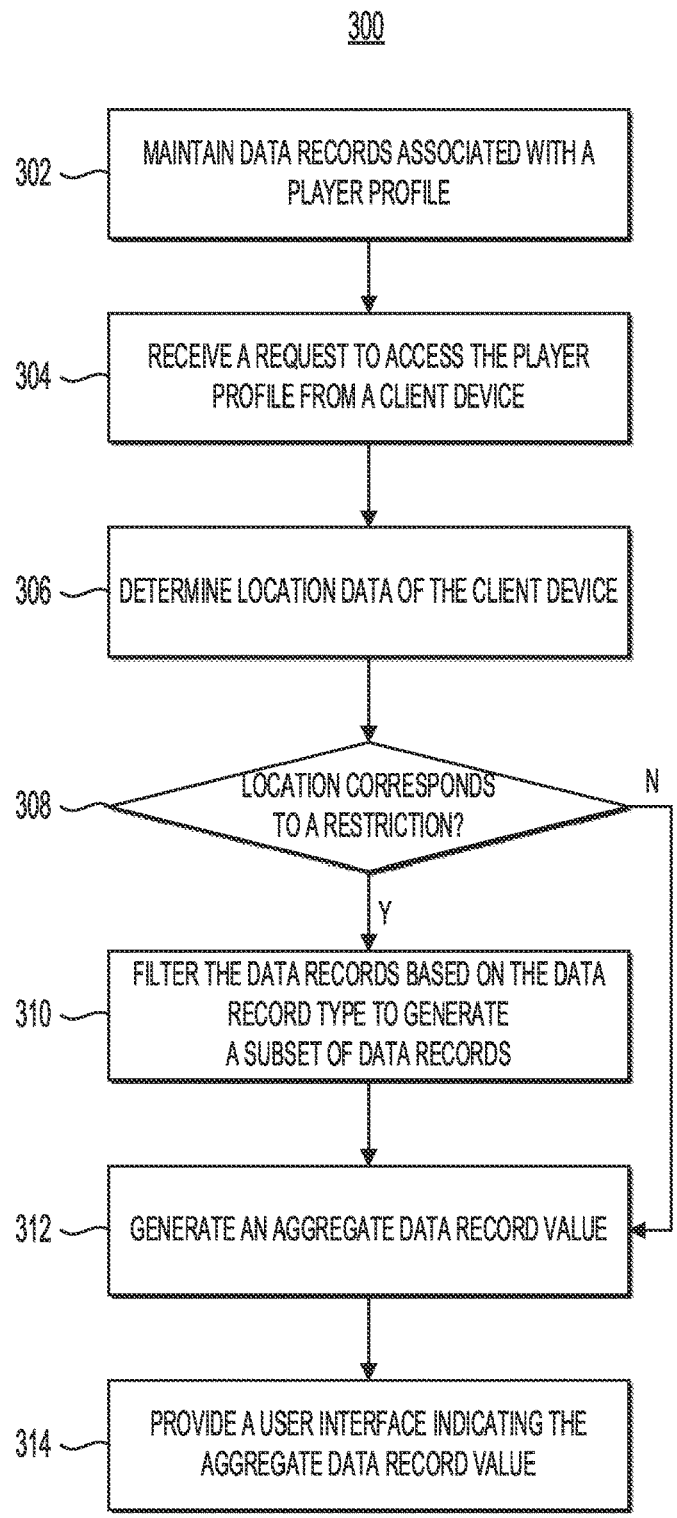
FIG. 3 illustrates an example flow diagram of a method for location-based assignment of client device data, in accordance with one or more implementations.

Referring now to FIG. 3, depicted is an illustrative flow diagram of a method 300 for location-based assignment of client device data. The method 300 can be executed, performed, or otherwise carried out by the data processing system 205, the computer system 100 described herein in conjunction with FIGS. 1A-1D, or any other computing devices described herein. In brief overview of the method 300, the data processing system (e.g., the data processing system 205, etc.) can maintain data records (e.g., the data records 275) associated with a player profile (e.g., a player profile 270) (STEP 302), receive a request to access the player profile from a client device (e.g., a client device 22) (STEP 304), determine location data of the client device (STEP 306), determine whether the location corresponds to a restricted location category (STEP 308), filter the data records based on a data record type (e.g., or other data record attributes 280) to generate a subset of data records (STEP 310), generate an aggregate data record value (STEP 312), and provide a user interface that indicates the aggregate data record value (STEP 314).

In further detail of the method 300, the data processing system (e.g., the data processing system 205, etc.) can maintain data records (e.g., the data records 275) associated with a player profile (e.g., a player profile 270) (STEP 302). Each data record can include or be associated with one or more data record attributes 280, which can indicate a respective data record type and a respective data record value. As described herein, the data records can be or include information relating to a credit balance increase of a player profile. To generate a data record, a client device can transmit a request to increase the credit balance of the player profile. The request may include location data of the client device at the time the request was transmitted. In some implementations, the request can identify an amount by which to increase the credit balance, and may include location information (e.g., GPS coordinates, wireless access point location data, cellular location data, satellite location information, etc.) of the client device that transmitted the request.

The request can include a source of funds for the credit balance increase. The source of funds can be a bank transfer (e.g., a debit card transfer, a credit card transfer, a wire transfer, an ACH transfer, etc.) or a credit transfer from another player profile, among other sources. Upon approval of the transfer (e.g., which may be verified by the data processing system), the data processing system can generate a data record that stores an association between the credit balance increase and the source of the funds used to carry out the increase. The source of funds may be stored, for example, as an additional column or row in a database entry corresponding to the funds increase. The data processing system can verify that the transfer of funds has been approved (e.g., in response to detecting an approval of a transfer of money, upon receiving a confirmation message from a third-party verification computing system, etc.). In implementations where the request to generate the data record includes payment information, the data processing system can execute a transaction (e.g., by communicating with an external payment system via the network 210), which can be verified by receiving an approval message from the external payment system.

Upon verification, the data processing system can generate the data record in association with the player profile that stores a record of the increase in the credit balance. The data processing system can generate corresponding data record attributes (e.g., the data record attributes 280) for the data record. As described herein, the data record attributes can include a data record value (e.g., an amount by which the credit balance was increased), a data record type, and in some implementations, location data of the client device that indicates a location of the client device when generation of the corresponding data record is requested. The data record type may include an indication of a source from which the credit transfer takes place (e.g., a bank transfer, a credit card purchase, a transfer from a second player profile, etc.). The data record attributes may be stored in association with a corresponding data record, and may be accessed to determine which data records can be utilized to perform various functions based on a location of the client device. The data record attributes may be generated, for example, upon approval of a transfer of credits to a credit balance of the player profile. The data record attributes may include an identifier of the player profile to which the corresponding data record corresponds.

The data processing system can receive a request to access the player profile from a client device (e.g., a client device 220) (STEP 304). The request to access the player profile can include any type of request relating to the data records. For example, the request can be a request to view an available credit balance of the player profile. The request may include login information, which can be verified by the data processing system prior to generating a response to the request, as described herein. The request to access the player profile can be transmitted by an application executing on the client device that communicates with the data processing system. The application may be a native or web-based application, and may include various functionalities that can be controlled (e.g., enabled, restricted, etc.) by the data processing system, using the techniques described herein. The request may be transmitted by the application in response to an interaction with one or more user interface elements in the application.

In some implementations, the application can be utilized to transmit a request to generate one or more data records for the player profile, as described herein. The request to access the player profile can be, for example, a request to view an available credit balance, a request to provide funds for a game, contest, or wager, a request view funds available based on a location of the client device, among any other request described herein. The request to access the player profile may be a request to view data associated with the player profile, such as the data records, the data record attributes, or other attributes of the player profile. In some implementations, the request to access the player profile can include location information of the client device. The location data can include any type of location-identifying information, such as GPS coordinates, wireless access point information, or cellular information (e.g., information relating to nearby cell towers, etc.), among others.

The data processing system can determine location data of the client device (STEP 306). As described herein, the location data can include can include any type of location-identifying information, such as GPS coordinates, wireless access point information, or cellular information (e.g., information relating to nearby cell towers, etc.), among others. The location data may be determined, for example, from the client device as part of the request to access the player profile, from the client device in response to a request from the data processing system, or from an external computing system. For example, the data processing system may communicate with one or more computing systems that maintain location information of client devices to retrieve location data (e.g., based on an identifier of the client device included in the request to access the player profile) for the requesting client device. The external computing system may be, for example, a computing system of a cellular provider or a location services provider.

The data processing system can determine whether the location corresponds to a restricted location category (STEP 308). The data processing system can determine whether the client device is located in one or more predetermined regions based on the location data when the client device transmitted the request to access the player profile. The data processing system can maintain a set of regions that are each associated with a respective category. The set of regions may be configured by an administrator of the data processing system (e.g., transmitted to the data processing system via a network, such as the network 210). The data processing system can utilize the location information of the client device to determine whether the client device is within any predetermined region (e.g., within a predetermined city, state, country, or predetermined boundary, etc.). If the data processing system determines that the client device is within a region corresponding to a restricted location category, the data processing system can determine that the client device is within a restricted location and proceed to execute STEP 310 of the method 300. If the data processing system determines that the client device is within a region corresponding to an unrestricted location category, the data processing system can determine that the client device is within an unrestricted location and proceed to execute STEP 312 of the method 300. The data processing system can store the location category of the client device in association with the corresponding request to access the player profile.

The data processing system can filter the data records based on a data record type (e.g., or other data record attributes 280) to generate a subset of data records (STEP 310). Certain locations may restrict functionality of the application executing on the client device, or may pose security risks with respect to the data records stored in association with the player profile. To address these issues, the data processing system can filter the data records by filtering the types of data records that are restricted from a particular location. For example, certain purchases (e.g., credit card purchases) may be not usable for certain actions (e.g., wagers) within certain regions. In some implementations, the data processing system can filter out all data records (e.g., corresponding to credits to a balance of the player profile) that have a type that identifies a credit card. Other types of filtering are also possible. For example, each region may be associated with a list of restricted data record types.

The data processing system can identify each data record associated with the player profile that does not have a type that is restricted for the particular region in which the client device was located upon transmitting the request to access the player profile. The subset of data records can be identified, for example, by scanning through each data record and comparing the type to one or more restricted types of the region, or performing a database query to lookup each of the data records having types that are not restricted by the respective region. If the region is an unrestricted region (e.g., all types of data records can be provided to the client device while the client device is within the region), the data processing system can identify all of the data records associated with the player profile of the client device.

The data processing system can generate an aggregate data record value (STEP 312). Once the data records (e.g., the subset if the client device is within a restricted location, or all the data records if the client device is within an unrestricted location) have been identified, the data processing system generate an aggregate data record value based on the respective data record value of each identified data record. To do so, the data processing system can iterate through the data record attributes of each identified data record, and sum the respective data record value (e.g., an amount by which the credit balance of the player profile was incremented). The aggregate value can be equal to the credit balance of the player profile less any contributions from restricted sources (e.g., credit card balances). Summing the data record values can include incrementing a counter by an amount equal to the respective data record value indicated in the data record attributes of each data record. The aggregate data record value can then be stored in association with the player profile, and in some implementations, in association with the one or more restrictions applied by the respective region in which the client device was located. In some implementations, the data processing system can store the aggregate data record value in association with a list or set of the data records that were filtered according to the restriction(s) of the region. In some implementations, the data processing system can store the aggregate data record value in association with a list or set of the data records that were not filtered (e.g., part of the subset identified by the data processing system).

The data processing system can provide a user interface that indicates the aggregate data record value (STEP 314). Once the aggregate data record value has been calculated, the data processing system can provide, for display at the client device, instructions to display a user interface indicating the aggregate data record value. The instructions can be provided to the client device in response to the request to access the player profile. For example, the data processing system can generate display instructions (e.g., HTML, JavaScript, configuration data that populates or configures one or more application interfaces, etc.) that cause the client device to display one or more user interfaces that indicate the aggregate data record value. In some implementations, the data processing system may provide data that is used by the application executing on the client device to populate one or more user interfaces displayed on the client device.

In some implementations, the data processing system can provide instructions to display an alert indicating that the aggregate data record value has been generated based on a subset of the data records. The alert may include one or more indications of the restriction(s) that were utilized to filter the data records, if any. The alert may include an indication of the detected location of the client device (e.g., the location data, the region within which the client device was determined to be present, etc.). In some implementations, the data processing system can cause the client device (e.g., by providing display instructions or data) to display a user interface indicating the subset of data records (e.g., those that were not filtered from the data records associated with the player profile). The user interface may be displayed, for example, in response to an interaction with an interactive user interface element at the user interface, or in response to the request to access the player profile, as described herein.

In some implementations, the data processing system can cause the client device to display (e.g., in one or more user interfaces) an indication of one or more data records that were filtered from the data records associated with the player profile. The filtered data records can be indicated as greyed out or may be displayed with an indicator that the respective data record (or the data record value associated therewith) was restricted. The various user interfaces described herein can be displayed in response to corresponding interactions, or in response to requests transmitted by the client device. The user interfaces described herein may include actionable objects that cause the client device to perform one or more operations (e.g., transmit requests to place wagers, enter contests, or otherwise utilize the aggregate data record value displayed on the user interface).

In some implementations, the data processing system can provide instructions to the client device to restrict at least one functionality of the application executing on the client device based on the aggregate value. For example, the data processing system can grey out, or otherwise make unselectable, certain graphical user interface elements that correspond to actions that are restricted by the location in which the client device is positioned. In some implementations, if the aggregate data record value (due to filtering) is less than a predetermined threshold for a particular action (e.g., a predetermined number of required credits for a game, wager, or contest), the data processing system can provide instructions to restrict the application from performing said actions. The instructions can include instructions to remove, hide, or otherwise make unselectable user interface elements corresponding to the respective actions. In some implementations, the data processing system can provide an alert indicating which actions within the application, if any, are restricted based on the aggregate data value. In some implementations, the user interface elements corresponding to the restricted actions can be displayed with a respective indicator that indicates the action corresponding to the user interface element has been restricted.

The data processing system can receive, via an interaction with the user interface displayed at the client device, a request to perform an action based on the aggregate data record value. For example, the aggregate data record value can correspond to a number of credits or a value that can be utilized to perform one or more actions via the data processing system, such as enter a contest, place a wager, or play a game. If the aggregate data record value satisfies a threshold corresponding to a particular action indicated in the request, the data processing system can reduce the aggregate data record value by an amount corresponding to the action (e.g., a specified wager amount, a contest entrance fee, a game fee or wager, etc.). Upon doing so, the data processing system can execute the particular action. For example, the data processing system can execute a contest based on the portion deducted from the aggregate data record value to enter the contest. Any particular action that may utilize credits or funds can be executed by the data processing system using the aggregate data value calculated based on the location of the client device and the data records.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them.

Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a GPS receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), an inter-network (e.g., the Internet), and peer-to-peer networks (e.g., ad hoc peer-to-peer networks).

The computing system such as the data processing system 205 can include clients and servers. For example, the data processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for location-based assignment of client device data, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method, comprising:
maintaining, by one or more processors, in a database, a plurality of data records associated with a player profile, each data record of the plurality of data records identifying a deposit, each data record of the plurality of data records comprising a respective account type and a respective deposit value, the respective account type identifying a respective type of account from which the respective deposit value was sourced;
receiving, by the one or more processors, from a client device associated with the player profile, a first request to access the player profile;
determining, by the one or more processors, based on the first request, first location data of the client device;

ing, by the one or more processors, responsive to the first location data satisfying a first location category, the plurality of data records based on the respective account type of each data record of the plurality of data records to generate a subset of data records, each of the subset of data records selected according to one or more permitted account types associated with the first location category;

generating, by the one or more processors, a first aggregate data record value by summing the respective deposit value of each data record of the subset of data records;

providing, by the one or more processors, for display at the client device, a first user interface indicating the first aggregate data record value;

receiving, by the one or more processors, from the client device associated with the player profile, a second request to access the player profile;

determining, by the one or more processors, based on the second request, second location data of the client device, the second location data different from the first location data;

generating, by the one or more processors, responsive to the second location data satisfying a second location category, a second aggregate data record value by summing the respective deposit value of each data record of the plurality of data records, the second aggregate data record value greater than the first aggregate data record value; and providing, by the one or more processors, for display at the client device, a second user interface indicating the second aggregate data record value.

2. The method of claim 1, further comprising providing, by the one or more processors to the client device, instructions to display an alert indicating the first aggregate data record value has been generated based on the subset of data records.

3. The method of claim 1, further comprising providing, by the one or more processors, instructions to the client device to restrict at least one functionality of an application executing on the client device based on the first aggregate data record value.

4. The method of claim 1, further comprising determining, by the one or more processors, that the first location data satisfies the first location category based on the first location data indicating the client device is within a predetermined region.

5. The method of claim 4, further comprising determining, by the one or more processors, that the second location data satisfies the second location category based on the second location data indicating the client device is outside of the predetermined region.

6. The method of claim 1, further comprising executing, by the one or more processors, a contest based on a portion of the first aggregate data record value of the subset of data records specified in a corresponding request received from the client device.

7. The method of claim 1, further comprising providing, by the one or more processors to the client device, instructions to display a third user interface indicating the subset of data records.

8. The method of claim 1, wherein the first user interface further comprises an indication of at least one data record that was filtered from the plurality of data records to generate the subset of data records.

9. The method of claim 1, further comprising receiving, by the one or more processors, via an interaction with the first user interface displayed at the client device, a request to perform an action based on the first aggregate data record value.

10. A system, comprising:
one or more processors; and
a non-transitory memory, wherein the one or more processors are configured to:
maintain, in a database, a plurality of data records associated with a player profile, each data record of the plurality of data records identifying a deposit, each data record of the plurality of data records comprising a respective account type and a respective deposit value, the respective account type identifying a respective type of account from which the respective deposit value was sourced;
receive, from a client device associated with the player profile, a first request to access the player profile;
determine, based on the first request, first location data of the client device;
filter, responsive to the first location data satisfying a first location category, the plurality of data records based on the respective account type of each data record of the plurality of data records to generate a subset of data records, each of the subset of data records selected according to one or more permitted account types associated with the first location category;
generate a first aggregate data record value by summing the respective deposit value of each data record of the subset of data records;
provide, for display at the client device, a first user interface indicating the first aggregate data record value;
receive, from the client device associated with the player profile, a second request to access the player profile;
determine, based on the second request, second location data of the client device, the second location data different from the first location data;
generate, responsive to the second location data satisfying a second location category, a second aggregate data record value by summing the respective deposit value of each data record of the plurality of data records, the second aggregate data record value greater than the first aggregate data record value; and
provide, for display at the client device, a second user interface indicating the second aggregate data record value.

11. The system of claim 10, wherein the one or more processors are further configured to provide, to the client device, instructions to display an alert indicating the first aggregate data record value has been generated based on the subset of data records.

12. The system of claim 10, wherein the one or more processors are further configured to provide instructions to the client device to restrict at least one functionality of an application executing on the client device based on the first aggregate data record value.

13. The system of claim 10, wherein the one or more processors are further configured to determine that the first location data satisfies the first location category based on the first location data indicating the client device is within a predetermined region.

14. The system of claim 13, wherein the one or more processors are further configured to determine that the second location data satisfies the second location category based on the second location data indicating the client device is outside of the predetermined region.

15. The system of claim 10, wherein the one or more processors are further configured to execute a contest based on a portion of the first aggregate data record value of the subset of data records specified in a corresponding request received from the client device.

16. The system of claim 10, wherein the one or more processors are further configured to provide, to the client device, instructions to display a third user interface indicating the subset of data records.

17. The system of claim 10, wherein the first user interface further comprises an indication of at least one data record that was filtered from the plurality of data records to generate the subset of data records.

18. The system of claim 10, wherein the one or more processors are further configured to receive, via an interaction with the first user interface displayed at the client device, a request to perform an action based on the first aggregate data record value.

* * * * *